[19] United States Patent
Watanabe et al.

[11] Patent Number: 5,987,992
[45] Date of Patent: Nov. 23, 1999

[54] ULTRASONIC SENSOR WITH TEMPERATURE COMPENSATION CAPACITOR

[75] Inventors: Koichi Watanabe, Shiga-ken; Chitaka Ochiai, Oumihachiman; Junshi Ohta; Masaharu Kota, both of Ishikawa-ken, all of Japan

[73] Assignee: Murata Manufacturing Co., Ltd., Japan

[21] Appl. No.: 09/006,286

[22] Filed: Jan. 13, 1998

[30] Foreign Application Priority Data

Mar. 7, 1997 [JP] Japan ................................ 9-053494

[51] Int. Cl.⁶ .................................................. C01N 29/00
[52] U.S. Cl. ............................ 73/632; 310/315; 310/334; 310/336; 310/346
[58] Field of Search ............................ 73/632, 596, 642; 310/311, 314–319, 334, 336, 340–341, 344, 346

[56] References Cited

U.S. PATENT DOCUMENTS

| 3,390,286 | 6/1968 | Gradin et al. ........................... 310/329 |
| 3,400,284 | 9/1968 | Elazar ..................................... 310/319 |
| 3,831,111 | 8/1974 | Lafferty ................................. 331/116 R |
| 3,967,143 | 6/1976 | Watanabe et al. ....................... 310/315 |
| 4,583,059 | 4/1986 | Konno ..................................... 331/158 |
| 4,608,506 | 8/1986 | Tanuma ................................... 310/315 |
| 4,851,791 | 7/1989 | Marotel ................................... 331/158 |
| 5,517,845 | 5/1996 | Yamashita et al. ..................... 73/1 DV |
| 5,608,359 | 3/1997 | Knecht et al. ........................... 331/68 |
| 5,734,087 | 3/1998 | Yamashita ............................... 73/1.15 |

FOREIGN PATENT DOCUMENTS 0 594 331 A1  4/1994  European Pat. Off. .
295 09 574 U  8/1996  Germany .

*Primary Examiner*—Hezron Williams
*Assistant Examiner*—Rose M. Miller
*Attorney, Agent, or Firm*—Graham & James LLP

[57] ABSTRACT

An ultrasonic sensor has a built-in temperature compensation capacitor housed in a casing and facilitates an inside-the-casing lead-wire bonding connection process and a connection verifying process while increasing reliability. The ultrasonic sensor is provided with a piezoelectric vibration element and a capacitor for temperature compensation capacitor both housed in a casing. The temperature compensation capacitor includes a pair of electrodes located on one common surface of a dielectric body thus allowing the ultrasonic sensor to be electrically connected to lead wires on the one common surface.

14 Claims, 9 Drawing Sheets

ULTRASONIC SENSOR WITH TEMPERATURE COMPENSATION CAPACITOR

BACKGROUND OF THE INVENTION

1. Field of the Invention

The present invention relates in general to ultrasonic sensors for use in detecting obstacles or the like by transmission and reception of ultrasonic waves and, more particularly, to improvements in ultrasonic sensors having a piezoelectric element and temperature compensation capacitor contained in a casing.

2. Description of the Prior Art

Conventionally, known ultrasonic sensors have been adapted for use as obstacle detection sensors in land vehicles, for example. FIG. 12 is a cross-sectional diagram for explanation of one example of the ultrasonic sensors of this type.

As shown in FIG. 12, an ultrasonic sensor 61 includes a cylindrical casing 62 made of a desired metal having one closed end. A closed end surface 62a of the casing 62 is adapted for transmission and reception of ultrasonic waves.

A piezoelectric vibration element 63 is secured inside the end surface 62a of casing 62. The piezoelectric vibration element 63 includes a piezoelectric ceramic plate which has a structure for allowing electrodes (not shown) to be disposed on the two principal surfaces of the piezoelectric ceramic plate comprised of PZT-based piezoelectric ceramics.

A sound-absorbing member 64 made of a desired polyester felt material is disposed near the piezoelectric vibration element 63. Also within the casing 62, a temperature compensation capacitor 65 is disposed above the sound-absorbing member 64. The temperature compensation capacitor 65 has a structure which allows for electrodes to be formed on the both principal surfaces of the temperature compensation capacitor 65. One principal-surface electrode of the temperature compensation capacitor 65 is electrically connected by a lead wire 66a to the piezoelectric vibration element 63. The remaining principal-surface electrode of temperature compensation capacitor 65 is electrically connected via a lead wire 66b to the casing 62. Note that the casing 62 is electrically coupled to the other principal surface (a lower surface as visible in the drawing) of the piezoelectric vibration element 63.

A couple of take-out or "external" lead wires 67a, 67b are connected to the electrodes on the both principal surfaces of temperature compensation capacitor 65, respectively. The external lead wires 67a, 67b are electrically coupled to a connector 68 provided outside of the casing.

The inside space of the casing 62 is filled with sound-absorbing silicon adhesive 69 for purposes of elimination of unwanted reflection of ultrasonic waves. Also, a sound-absorbing member 70 is arranged so as to cover the open end side of the casing 62. The sound-absorbing member 70 may be made of expanded polyurethane.

In the ultrasonic sensor 61, the temperature compensation capacitor 65 is arranged and constructed in consideration of the fact that the electrostatic capacitance of the piezoelectric vibration element 63 can significantly vary with a change in temperature resulting in the resonance characteristics being varied or deviated.

However, elimination of the temperature compensation capacitor 65 would reduce workability of the bonding connections made via soldering of lead wires 66a, 66b, 67a, 67b during assembly of the ultrasonic sensor 61.

More specifically, during assembly of the ultrasonic sensor 61, it is necessary that the bonding connections by use of the lead wires 66a, 66b be completed prior to injection or packing of the silicon resin 69 in the casing 62. Unfortunately, since the temperature compensation capacitor 65 is structured and arranged so that the electrodes are disposed on the two principal surfaces of the temperature compensation capacitor 65, it is necessary to connect each individual one of such lead wires 66a, 66b by soldering techniques to a corresponding one of the electrodes on respective principal surfaces of the temperature compensation capacitor 65 individually while simultaneously forcing the temperature compensation capacitor 65 to be kept stationary at a certain position shown in FIG. 12, which increases the complexity and difficulty of the wire-bonding process.

In addition, it is required during injection of the silicon resin 69 that workers verify by visual inspection whether the lead wires 66a, 66b are reliably and securely in contact with the temperature compensation capacitor 65 and make sure that the lead wires 66a, 66b have not accidentally become detached from the temperature compensation capacitor 65. Because this structure has the lead wires 66a, 66b coupled to both principal surfaces of the temperature compensation capacitor 65, it is necessary to visually check a respective one of the two principal surfaces of temperature compensation capacitor 65 by time-consuming visual inspection methods which are subject to human error and errors in judgment.

Further, with regard to the bonding connection of lead wires 67a, 67b, it has been necessary for workers to verify—prior to hardening of the sound-absorbing material 70—that the lead wires 67a, 67b are reliably coupled with the temperature compensation capacitor 65. It has also been necessary that workers inspect a respective one of the two principal surfaces of the temperature compensation capacitor 65 due to the fact that such lead wires 67a, 67b are to be connected to the electrodes on both principal surfaces of the temperature compensation capacitor 65, respectively.

Furthermore, since the temperature compensation capacitor 65 has a structure for eliminating the electrostatic capacitance from the electrodes located on both principal surfaces of the temperature compensation capacitor 65, the resulting overall size of the device remains relatively large. Accordingly, distortion can take place upon application of thermal shocks from outside of the device. Another problem experienced in the prior art devices is that during injection of silicon resin 69, gas bubbles or air voids can appear within the casing 62 due to ultrasonic wave reflection because of the relatively large size of the temperature compensation capacitor 65 and also because of an increased area required for contact between the silicon resin 69 and the temperature compensation capacitor 65.

A further problem is that ultrasonic-wave reflection caused by the temperature compensation capacitor 65 per se can be present above negligible levels because of the fact that the temperature compensation capacitor 65 must have a relatively large size.

In addition, arranging the temperature compensation capacitor 65 in a specific orientation in which the principal surfaces of the temperature compensation capacitor 65 are at right angles to the piezoelectric vibration element 63 results in a noticeable increase in distance from the upper end of the temperature compensation capacitor 65 to the piezoelectric vibration element 63. For this reason, the temperature sensitivity or tracking ability of the capacitor 65 with respect to temperature variations of vibration element 63 is insufficient which makes it impossible to achieve sufficient temperature compensation functions.

SUMMARY OF THE INVENTION

To overcome the problems described above, the preferred embodiments of the present invention provide an ultrasonic sensor with a piezoelectric vibration element and a temperature compensation capacitor housed in a casing, wherein the sensor has excellent reliability and has a structure which allows for much easier assembly and electrical coupling of the temperature compensation capacitor.

The preferred embodiments of the present invention also provide an ultrasonic sensor with a specific structure which reduces the occurrence of distortion in the temperature compensation capacitor upon application of thermal shocks thereto, suppresses the production of air bubbles during injection of elastic resin materials for filling the inside of the casing and eliminates any undesired ultrasonic wave reflection.

The preferred embodiments of the invention further provide an ultrasonic sensor with a temperature compensation capacitor, the sensor achieving excellent tracking ability or "trackability" of the temperature compensation capacitor with respect to temperature variations of an associative piezoelectric vibration element thus achieving an improved temperature compensation function.

According to one preferred embodiment of the present invention, an ultrasonic sensor includes a casing, a piezoelectric vibration element housed in the casing, a temperature compensation capacitor housed in the casing, a pair of electrodes provided on a single common surface of the temperature compensation capacitor, a pair of first lead wires electrically connecting the piezoelectric element and the temperature compensation capacitor via the pair of electrodes, respectively, and a pair of second lead wires connected to the temperature compensation capacitor via the pair of electrodes, respectively and extending from an interior to an exterior of the casing.

Note that the first and second lead wires may be formed as a single, cofunctional lead wire.

In accordance with the above-described ultrasonic sensor, since a temperature compensation capacitor has a structure in which a pair of electrodes are located on a single common surface thereof, it becomes possible to easily perform the bonding connection process of associated lead wires with respect to the temperature compensation capacitor within the casing while simultaneously allowing for easy verification of bonded portions between the temperature compensation capacitor and lead wires prior to injection and packing of elastic resin into the inside of the casing. Accordingly, the productivity of assembling ultrasonic sensors and the reliability and performance of the ultrasonic sensors is increased while manufacturing costs are reduced.

In the above ultrasonic sensor, the temperature compensation capacitor is preferably less than $\lambda/4$ in size in the propagation direction of ultrasonic waves, where $\lambda$ is a wavelength of an ultrasonic wave generated in the piezoelectric vibration element.

When the temperature compensation capacitor is less than $\lambda/4$ in size in the ultrasonic wave propagation direction where $\lambda$ is the wavelength of an ultrasonic wave, it is possible to eliminate production of unnecessary or "extraneous" reflection caused by the presence of standing wave components of an ultrasonic wave while simultaneously enhancing thermal shock durability, and it is further possible to suppress the risk of air bubbles being created during packing of elastic resin. It is thus possible to eliminate undesired ultrasonic wave reflection otherwise occurring due to suppression of air bubbles, and also to suppress reflection of undesired ultrasonic waves which may be caused by the capacitor per se. This makes it possible to achieve miniaturization of the ultrasonic sensor while improving thermal shock durability and measurement accuracy.

In the above ultrasonic sensor, a distance between a portion of the temperature compensation capacitor which is spaced farthest from the piezoelectric vibration element and the piezoelectric vibration element is preferably less than $\lambda/4$ in the propagation direction of an ultrasonic wave, where $\lambda$ is the wavelength of the ultrasonic wave generated in the piezoelectric vibration element.

When the distance between the certain portion of the temperature compensation capacitor spaced farthest from the piezoelectric vibration element and the piezoelectric vibration element is less than $\lambda/4$, the temperature trackability of the temperature compensation capacitor with respect to the piezoelectric vibration element is enhanced enabling effective suppression of variations of the ultrasonic-sensor measurement accuracy due to a temperature change, which in turn leads to reliably providing an ultrasonic sensor which has stable temperature characteristics.

These and other objects, features and advantages of the invention will be apparent from the following more particular description of preferred embodiments of the invention, as illustrated in the accompanying drawings.

DETAILED DESCRIPTION OF PREFERRED EMBODIMENTS

Figure 1:
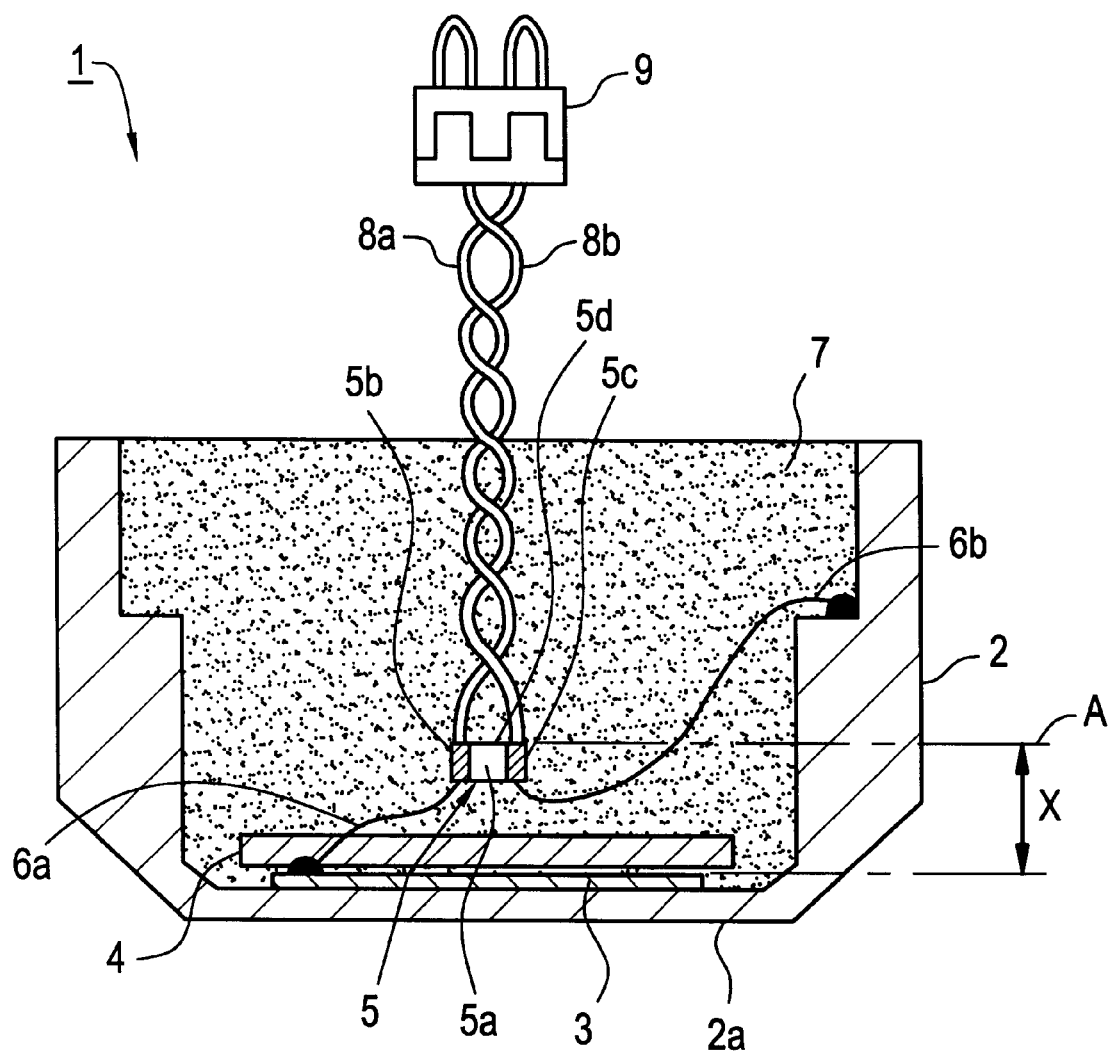
FIG. 1 is a diagram showing in cross-section of an ultrasonic sensor in accordance with a first preferred embodiment of the present invention.

FIG. 1 illustrates in cross-section an ultrasonic sensor in accordance with one preferred embodiment of the present invention. As shown, the ultrasonic sensor 1 is structured so that a piezoelectric vibration element 3 is disposed within a cylindrical casing 2. The cylindrical casing 2 may be made of a desired metal such as aluminum or other suitable material. The casing 2 is closed at its lower part permitting transmission and reception of ultrasonic waves from a lower end surface 2a.

A piezoelectric vibration element 3 is joined to an inside portion of the end surface 2a. The piezoelectric vibration element 3 has a structure which allows electrodes (not shown) to be located to be located on both principal surfaces of a piezoelectric plate forming the piezoelectric vibration element 3, which plate is made of PZT-based piezoelectric ceramics. Note that the lower electrode is bonded via a desired adhesive (not shown) to the casing 2 in a direct contact manner. The casing 2 is comprised of a metallic material so that the lower surface electrode of the piezoelectric vibration element 3 is electrically connected to the casing 2.

A sound absorbing member 4 is disposed above the piezoelectric vibration element 3. The sound-absorbing member 4 is provided for absorbing reflection of any undesired ultrasonic wave components. For the acoustic material 4, any suitable materials may be used as long as such materials can eliminate reflection of undesired ultrasonic waves. In this preferred embodiment, a polyester felt member is used although the present invention should not exclusively be limited thereto.

A temperature compensation capacitor 5 is disposed above the sound-absorbing member 4. As shown in more detail in FIG. 2, the temperature compensation capacitor 5 has a structure in which electrodes 5b, 5c are located on both ends of a dielectric body 5a having a substantially rectangular shape. This capacitor 5 is preferably constructed from a multilayer ceramic capacitor, wherein the dielectric body 5a is made of dielectric ceramic material and includes a plurality of internal electrodes arranged for internally taking electrostatic capacitance out of the surface. These internal electrodes are electrically interconnected to either the electrode 5b or electrode 5c shown in FIG. 2.

Each of the electrodes 5b, 5c is arranged to extend from one end surface of the dielectric body 5a covering other four surfaces coupling or "mating" therewith. Accordingly, the pair of electrodes 5b, 5c are present on a common surface of the dielectric body 5a—an upper surface 5d, for example. Note here that in the temperature compensation capacitor 5, the electrodes 5b, 5c may also exist on a respective one of a lower surface and a pair of side surfaces, in addition to the upper surface 5d.

Turning back to FIG. 1, an upper surface electrode (not shown) of the piezoelectric vibration element 3 is electrically connected by a lead wire 6a to the electrode 5b of the temperature compensation capacitor 5. Also, the electrode 5c of temperature compensation capacitor 5 is electrically coupled by a lead wire 6b to the metal casing 2. Bonding connection of the lead wires 6a, 6b is performed by soldering techniques, using conductive adhesive or other suitable techniques.

In the ultrasonic sensor 1 of this preferred embodiment, since the pair of electrodes 5b, 5c are located on one common surface of the dielectric body 5a, it is possible to easily perform coupling or bonding of the lead wires 6a, 6b to the temperature compensation capacitor 5. More specifically, where such lead wires 6a, 6b are coupled or contacted with the electrodes 5b, 5c by soldering techniques, for instance, the process of coupling lead wires 6a, 6b may be easily done on one common surface of the dielectric body 5a because of the fact that these electrodes 5b, 5c are located on such a single common surface of the dielectric body 5a.

It is also to be noted that an elastic resin 7 is packed within the casing 2 to fill the interior of the casing 2. The elastic resin 7 is comprised of a desired resin that is excellent in elasticity or resiliency—such as silicon resin, butyl rubber or the like, by way of example—thereby to suppress unwanted ultrasonic wave reflection.

Prior to filling the casing 2 with the elastic resin 7, the bonding connection process of the lead wires 6a, 6b must have been completed. It is thus required during injection of elastic resin 7 that visual inspection must be done for checking whether the lead wires 6a, 6b are firmly contacted with and coupled to the temperature compensation capacitor 5. In the ultrasonic sensor 1 of this preferred embodiment, since the lead wires 6a, 6b are connected to electrodes on a single common surface of the dielectric body 5a of the temperature compensation capacitor 5, it becomes possible to easily verify by a one-time visual inspection the contact/junction state of these lead wires 6a, 6b.

More specifically, it has been required in the prior art ultrasonic sensor 61 that after visual inspection was done to verify a contact portion on either one principal surface of the temperature compensation capacitor 65, verification as to the remaining contact portion on the opposite principal surface of the capacitor 65 must be repeatedly carried out. In contrast, with the ultrasonic sensor 1 of this preferred embodiment of the present invention, it is possible to verify both contact portions located on a single common surface of the dielectric body 5a with a single visual inspection.

Extension lead wires 8a, 8b are connected by soldering techniques or the like to the temperature compensation capacitor 5. The extension lead wires 8a, 8b are arranged to extend from an interior to an exterior of the casing 2 and are then connected to a connector 9. The connector 9 is provided for enabling rapid connection to an associated component including an amplifier which provides an output of the ultrasonic sensor 1.

With regard to bonding connection of the extension lead wires 8a, 8b to the temperature compensation capacitor 5, this must be performed prior to filling with the elastic resin 7. In this case also, it is possible to easily verify by a single-step visual inspection the contact state of such extension lead wires 8a, 8b with respect to the temperature compensation capacitor 5.

Figure 2:
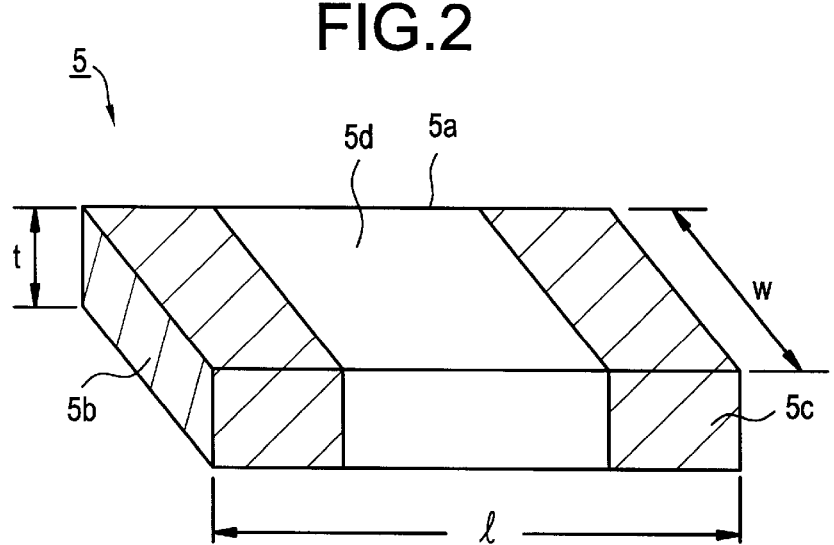
FIG. 2 shows a perspective view of a temperature compensation capacitor as used in the first preferred embodiment.

Further, the size of the temperature compensation capacitor 5 in the ultrasonic wave propagation direction is preferably designed to be less than a quarter of the ultrasonic wavelength$\lambda$.($\lambda$/4). In a practical example, the length l, width w and thickness t shown in the preferred embodiment of FIG. 2 are preferably arranged such that l=3.3 mm, w=1.6 mm, and t=0.6 mm. In other words, the acoustic wave propagation velocity or rate C in air having a temperature of 20° C. is C=344 m/sec. At a frequency of 40 kHz, the wavelength$\lambda$ is given as $\lambda$=C/f=8.6 mm. Therefore, $\lambda$/4= 2.15 mm so that the W=1.6 mm is less than $\lambda$/4. Additionally, the distance between the piezoelectric vibration element and the portion of the piezoelectric vibration element of the temperature compensation capacitor spaced farthest from the piezoelectric vibration element is preferably approximately equal to 2.0 mm. This distance also is preferably less than $\lambda/4$.

The aforesaid size W of the temperature compensation capacitor 5 is less than $\lambda/4$ so that unnecessary reflection does not take place which would otherwise occur due to the presence of standing wave components of the ultrasonic waves. Furthermore, the thermal shock durability is enhanced because of the fact that distortion due to heat hardly occurs even upon external application of thermal shocks to the ultrasonic sensor.

In addition, since the contact area between the temperature compensation capacitor 5 and the elastic resin 7 remains small during injection and packing of the elastic resin 7, air bubbles hardly appear thus enabling suppression of any undesired ultrasonic wave reflection otherwise occurring due to production of such air bubbles.

It should be noted that although in this preferred embodiment the multilayer capacitor had a substantially rectangular solid-like shape for forming the temperature compensation capacitor 5, the structure of the preferred embodiments of the present invention usable as the temperature compensation capacitor should not exclusively be limited thereto. In other words, any capacitors with appropriate structures may also be used as long as they are structured to have a pair of electrodes on one common surface of the dielectric body thereof.

Figure 3:
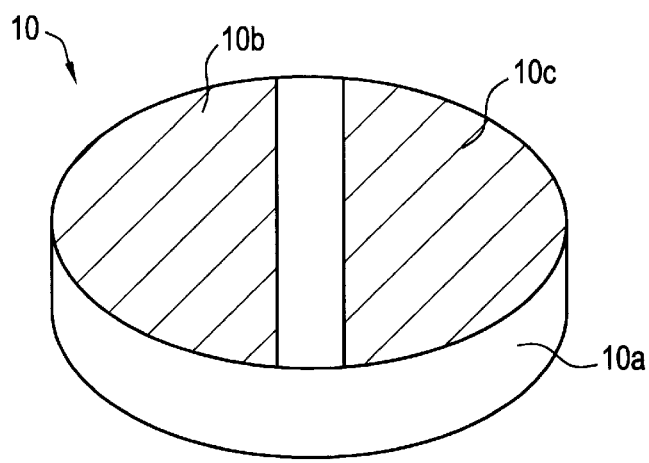
FIGS. 3 and 4 are diagrams each showing a perspective view of another exemplary temperature compensation capacitor which may be used in the preferred embodiments of the present invention.
Figure 4:
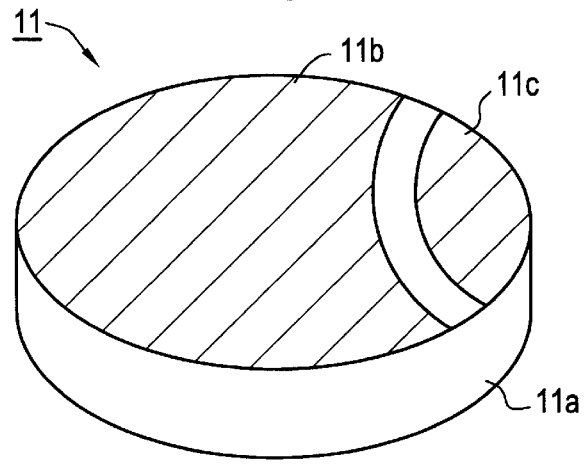

By way of example, as shown in FIG. 3, a capacitor 10 which is constructed from a substantially circular or disk-like dielectric body 10a with a pair of electrodes 10b, 10c being disposed on at least one common surface thereof may also be used. Alternatively, as shown in FIG. 4, a capacitor 11 having a disk-like dielectric body 11a and a pair of electrodes 11b, 11c disposed on at least one common principal surface thereof and having a different electrode area or planar coverage from each other may also be used. The disk-like dielectric bodies 10a, 11a may alternatively be designed in other shapes, including substantially rectangular-plate shapes or the like.

Regarding the capacitors 10, 11, since the capacitors have the electrode pair 10b, 10c or 11b, 11c located on a single common surface, the same effects and advantages are achieved as are obtained in the ultrasonic sensor 1 shown in FIG. 1 when any one of such capacitors 10, 11 is used instead of the temperature compensation capacitor 5.

If the capacitors 10, 11 shown in FIGS. 3 and 4 also have a size relative to the ultrasonic wave propagation direction that is less than $\lambda/4$ and have a distance between a piezoelectric vibration element and the portion of the capacitors located farthest from the piezoelectric vibration element which is less than $\lambda/4$, it is possible—in a manner similar to that of the case of using the temperature compensation capacitor 5—to attain i) an improvement in thermal shock durability, ii) suppression of unwanted ultrasonic wave reflection caused by production of air bubbles, and iii) suppression of undesired ultrasonic wave reflection caused by the temperature compensation capacitor per se.

Further, in the preferred embodiments of the present invention, the material constituting the dielectric body of the temperature compensation capacitor should not be limited to the dielectric ceramic only, and may also be made of other materials including resin or equivalents thereto.

In this way, the temperature trackability of the temperature compensation capacitor 5 with respect to a temperature change of the piezoelectric vibration element 3 is improved by letting the distance x (shown in FIG. 1) be less than $\lambda/4$ while simultaneously causing the portion of the temperature compensation capacitor 5 located farthest from the piezoelectric vibration element 3 to be located closer to the piezoelectric vibration element 3 as compared to the case of the prior art ultrasonic sensor 1. As a consequence, it should be readily seen that a desired temperature compensation function performed by the temperature compensation capacitor 5 is sufficiently attainable.

Similarly, concerning the capacitors 10, 11 shown in FIGS. 3 and 4, it is possible, in a way similar to that of the case using the temperature compensation capacitor 5, to achieve i) an improvement in thermal shock durability, ii) suppression of unwanted ultrasonic wave reflection due to production of air bubbles, and iii) suppression of undesired ultrasonic wave reflection by the temperature compensation capacitor per se.

Figure 5:
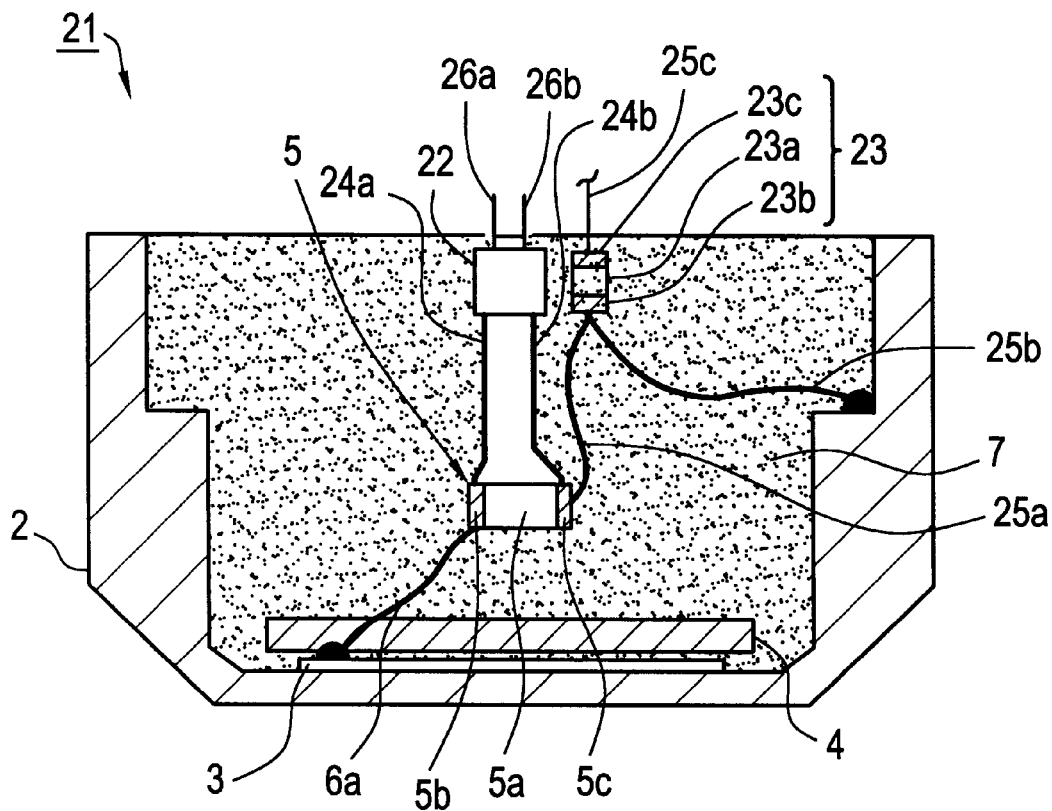
FIG. 5 illustrates in cross-section an ultrasonic sensor in accordance with a second preferred embodiment of the present invention.
Figure 6:
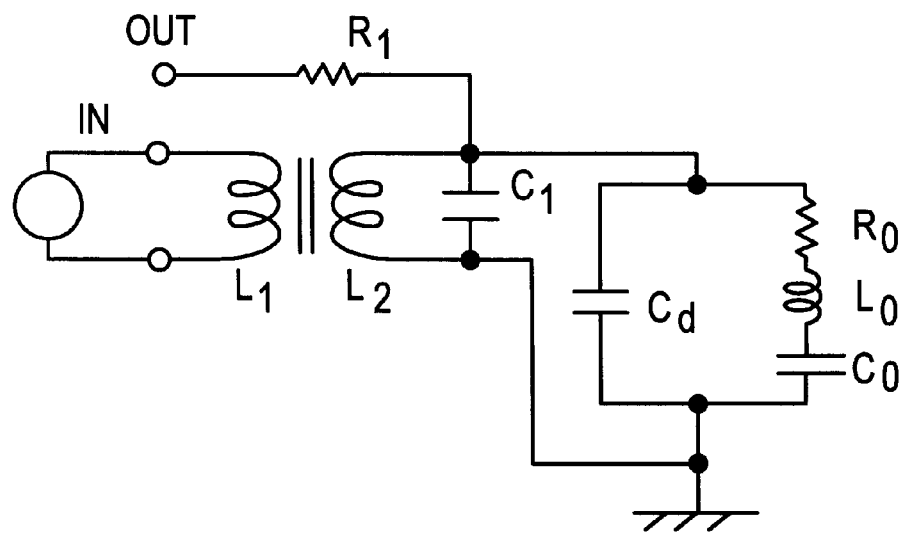
FIG. 6 is a diagram showing a circuit configuration of the ultrasonic sensor of the second preferred embodiment.

An ultrasonic sensor in accordance with a second preferred embodiment of the present invention is generally designated by numeral 21 in FIG. 5, which has a circuit configuration shown in FIG. 6. The ultrasonic sensor 21 of FIG. 5 is similar in structure to the ultrasonic sensor 1 of the first preferred embodiment with a transformer element 22 which acts as an inductive element and a resistive element 23 being located further in the interior of the casing 2 in addition to the temperature compensation capacitor 5. Accordingly, certain parts or components similar to those of the ultrasonic sensor 1 shown in FIG. 1 are associated with the same reference numerals for purposes of clarity only; and, detailed explanations therefore will be omitted by incorporating herein the explanations as to the ultrasonic sensor 1 shown in FIG. 1.

A lead wire 6 a which is in contact with an upper surface electrode (not shown) of the piezoelectric vibration element 3 is electrically connected to one electrode 5b of the temperature compensation capacitor 5. The transformer element 22 is connected to this electrode 5b via a lead wire 24a. Similarly, the transformer element 22 is also connected to the remaining electrode 5c of the temperature compensation capacitor 5 through a lead wire 24b. The resistive element 23 is connected by a lead wire 25a to the electrode 5c.

The resistive element 23 includes electrodes 23b, 23c located on the both ends of a resistance body 23a. The lead wire 25a is electrically connected to one electrode 23b. Also, a lead wire 25b is connected to the electrode 23b while causing the lead wire 25b to be electrically coupled to the casing 2 at the other end thereof.

On the other hand, an extension lead wire 25c is electrically connected to the remaining electrode 23c of the resistive element 23. This extension lead wire 25c extends from inside the casing to outside of the casing 2. Further, the transformer element 22 is also coupled with extension lead wires 26a, 26b. The extension lead wires 26a, 26b, 25c are connected with a connector (not shown) provided outside of the casing 2.

In this preferred embodiment also, the temperature compensation capacitor 5 is structurally arranged to have a pair of electrodes 5b, 5c formed on one common surface of the dielectric body 5a. It is thus possible to simplify the process of bonding for interconnection of the lead wires 6a, 25a, 24a, 24b to the temperature compensation capacitor 5 in a way similar to that of the first preferred embodiment.

Further, concerning the resistive element 23, this element is also configured in a way such that the electrodes 23b, 23c are placed on a single common surface of the resistance body 23a. Accordingly, it is also possible to simplify the process of coupling lead wires 25a, 25b, 25c to the resistive element 23 in a manner similar to that in the case of the temperature compensation capacitor 5.

Consequently, in the second preferred embodiment also, the lead-wire bonding/coupling process is made much easier enabling easy verification of contact portions of these lead wires during packing of the elastic resin 7.

It should be noted that since the temperature compensation capacitor 5 is designed such that its maximum outside dimension or size is preferably within about 5 mm as in the first preferred embodiment, it is possible—in a way similar to that of the first preferred embodiment—to achieve i) an improvement in thermal shock durability, ii) suppression of unwanted ultrasonic wave reflection caused by production of air bubbles, and iii) suppression of undesired ultrasonic wave reflection at the temperature compensation capacitor 5.

Preferably, the approximately 5-mm maximum outside dimension design scheme may also be applied to the resistive element 23 and transformer element 22, thereby rendering attainable similar functions and advantages stated supra.

As has been discussed above, the ultrasonic sensor 21 is arranged to include therein a built-in transformer element 22 and resistive element 23 which are connected in the manner mentioned previously. Accordingly, it is apparent from viewing the circuit diagram shown in FIG. 6 that the temperature compensation capacitor 5 and transformer element 22 as well as resistive element 23 constitute a built-in LCR resonant which is an integral part within the casing 2.

In FIG. 6, reference characters "$L_1$" and "$L_2$" designate primary side and secondary side inductances in the transformer element 22; "$C_1$" indicates the electrostatic capacitance of temperature compensation capacitor 5; "$R_1$" shows the resistance of resistive element 23; and, "$R_0$," "$L_0$," "$C_0$" and "$C_d$" show parts forming an equivalent circuit of the piezoelectric vibration element 3.

Here, since the inductance $L_2$ and capacitances $C_1$, $C_d$ constitute a parallel resonant circuit, the resonance frequency $f_0$ may be represented by:

$$f_0 = 1/2\pi\sqrt{L_2 \times (C_1 + C_d)} \qquad (1)$$

This indicates that the impedance is infinite at the resonant frequency.

On the other hand, the equivalent inductance $L_0$ and equivalent electrostatic capacitance $C_0$ of the piezoelectric vibration element 3 constitute a series resonant circuit so that the resonance frequency $f_0$ in this case is given as:

$$f_0 = 1/2\pi\sqrt{L_0 \times C_0} \qquad (2)$$

At the resonance frequency the impedance will be zero.

Therefore, it will be appreciated that the temperature trackability of the ultrasonic sensor 21 is improved by appropriately determining the values of inductance $L_2$ and the electrostatic capacitance $C_1$ of the temperature compensation capacitor 5 so as to force the impedance of ultrasonic sensor 21 to be minimized at the resonance frequency while at the same time allowing the ultrasonic sensor 21 contain these components therein as built-in components.

Figure 7A:
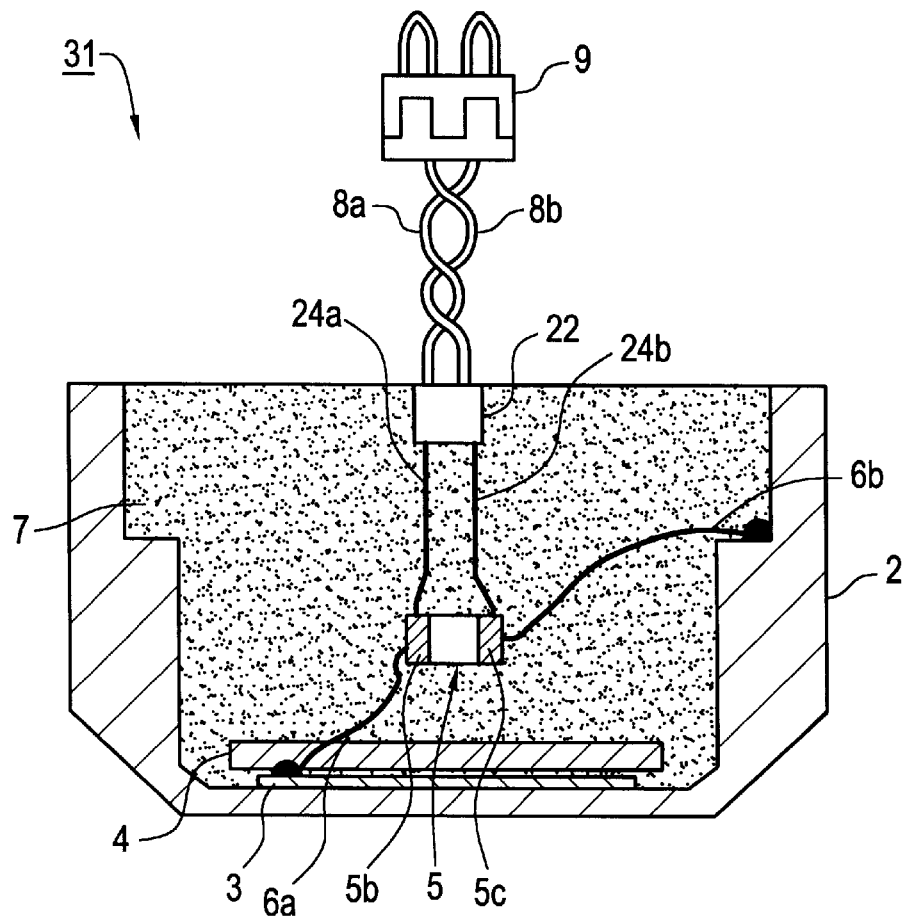
FIG. 7A shows in cross-section an ultrasonic sensor in accordance with a third preferred embodiment of the present invention.
Figure 7B:
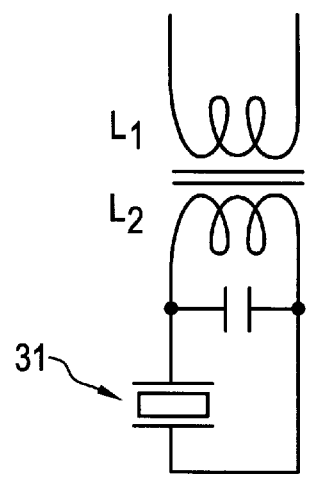
FIG. 7B depicts a circuit configuration thereof.

An ultrasonic sensor in accordance with a third preferred embodiment of the present invention is generally designated by numeral 31 in FIG. 7A, which has a circuit configuration shown in FIG. 7B. The ultrasonic sensor 31 of FIG. 7A is similar in structure to the ultrasonic sensor 1 of the first preferred embodiment except that the transformer element 22 acting as an inductive element is connected to the temperature compensation capacitor 5 constituting an LC resonant circuit. Like parts or components are associated with like reference numerals, and a detailed explanation will be omitted.

The transformer element 22 is connected to the electrodes 5b, 5c of the temperature compensation capacitor 5 via lead wires 24a, 24b, respectively. Transformer element 22 is also disposed in the casing 2 and is secured by elastic resin 7 within casing 2. Element 22 is connected with lead wires 8a, 8b.

In the manner described above, with the ultrasonic sensor 31 according to preferred embodiments of the present invention, the LC resonant circuit may be arranged within the casing 2 by connection of the transformer element 22 in addition to the temperature compensation capacitor 5, thereby improving the temperature trackability in a manner similar to that of the ultrasonic sensor 21 of the second preferred embodiment.

Figure 8:
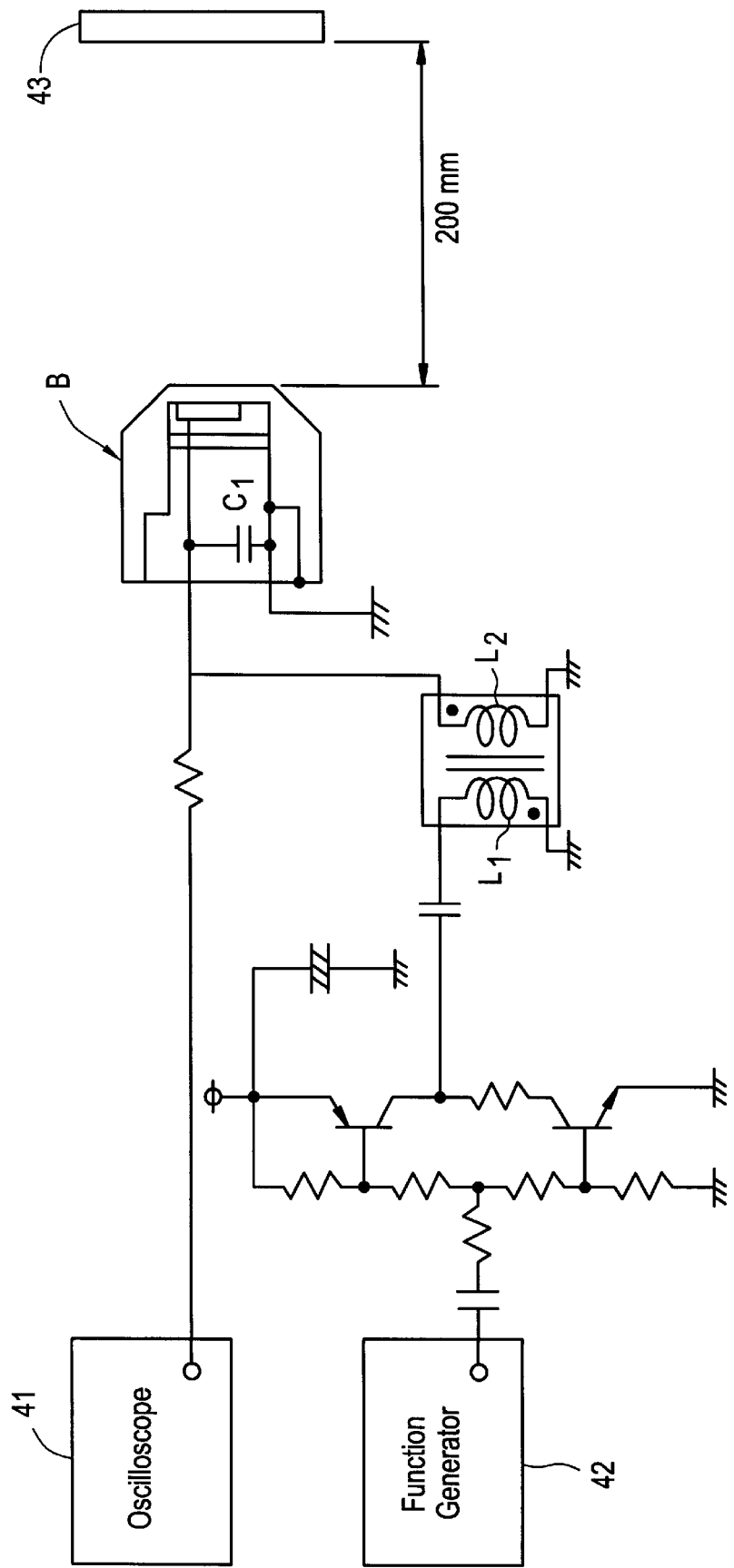
FIG. 8 is a circuit diagram of measurement circuitry used in measuring the characteristics of an ultrasonic sensor according to a preferred embodiment of the present invention.

An explanation will be given of practical experimentation examples of the ultrasonic sensor 1 in accordance with the first preferred embodiment and the ultrasonic sensor 21 of the second preferred embodiment. With regard to the ultrasonic sensors 1, 21, a measurement circuit shown in FIG. 8 was used for measurement of temperature characteristics thereof. In the measurement circuit of FIG. 8, reference numeral "41" designates an oscilloscope whereas "42" indicates a function generator. The function generator operates to generate an ultrasonic pulse of a rectangular-waveform at a frequency of 40 kHz with a pulse width of 0.2 msec, pulse cycle of 50 Hz and a voltage of 10VO-P, which pulse is applied to an ultrasonic sensor B and is then projected onto a reflection plate 43 disposed at a location spaced by about 200 mm for measurement of an ultrasonic echo as reflected therefrom by use of the ultrasonic sensor B and then observation of a transmission waveform and its corresponding received waveform at the oscilloscope 41.

As the ultrasonic sensor B, the ultrasonic sensor 1 with specifications as will be presented below was used for measurement of the transmission and reception of ultrasonic waves; then, the results shown in FIG. 9 were obtained.

The ultrasonic sensor 1 is preferably comprised of a PZT-based piezoelectric ceramic and includes a disk-like piezoelectric ceramic plate measuring about 7 mm in diameter and about 0.16 mm in thickness with silver electrodes disposed on both principal surfaces thereof.

The temperature compensation capacitor comprises a multilayer capacitor measuring about 3.3 mm×1.6 mm×0.6 mm and its electrostatic capacitance is about 1400 pF and the distance ×is about 2 mm.

Figure 9:
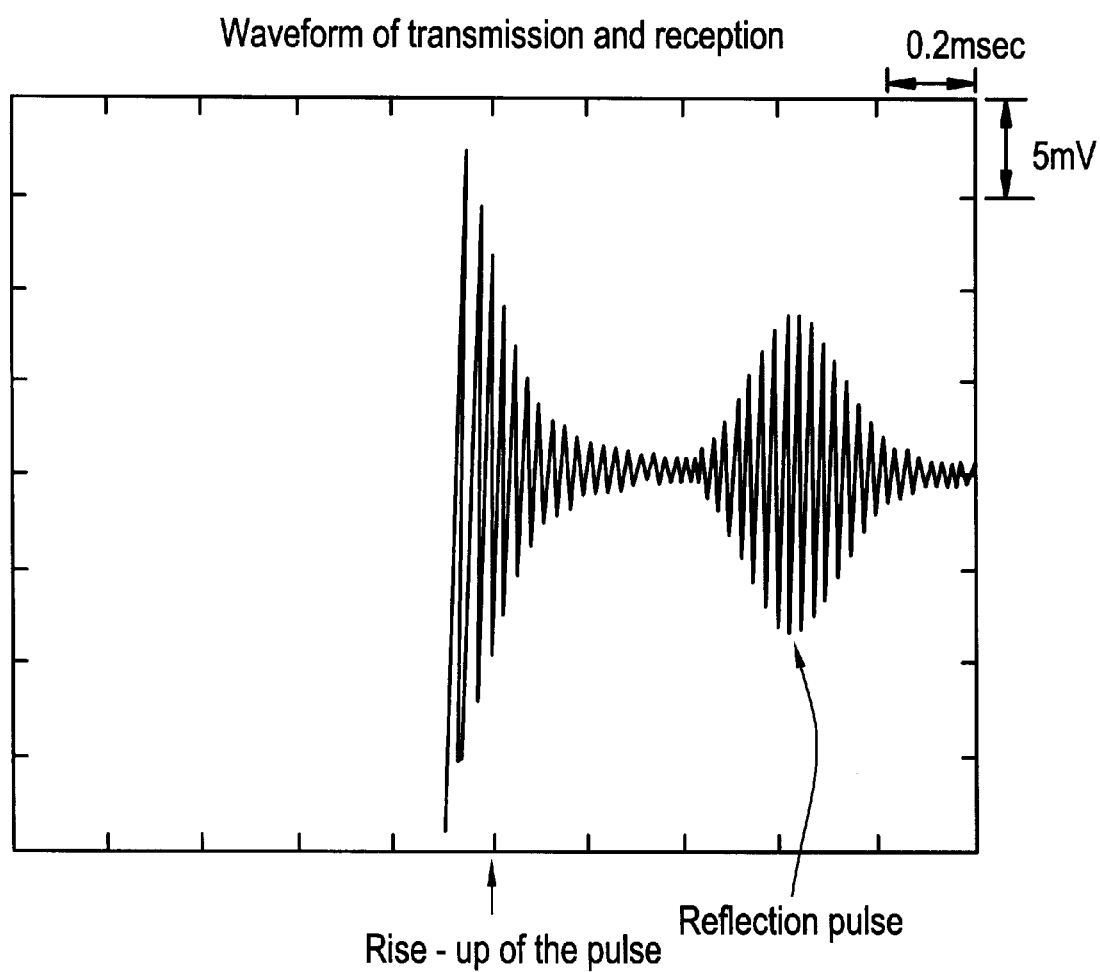
FIG. 9 is a graph showing a waveform observed on an oscilloscope for explanation of measurement results of the ultrasonic sensor in accordance with the first preferred embodiment.

As seen from FIG. 9, the rise-up time of the ultrasonic pulse—namely, a time period from initiation of transmission of an ultrasonic wave to a time point where at the intensity of resultant reflection signal Y reached 2 mVPP—was measured to reveal that such time was 1.0 msec whereas the sensitivity was 16 mVPP.

Figure 10:
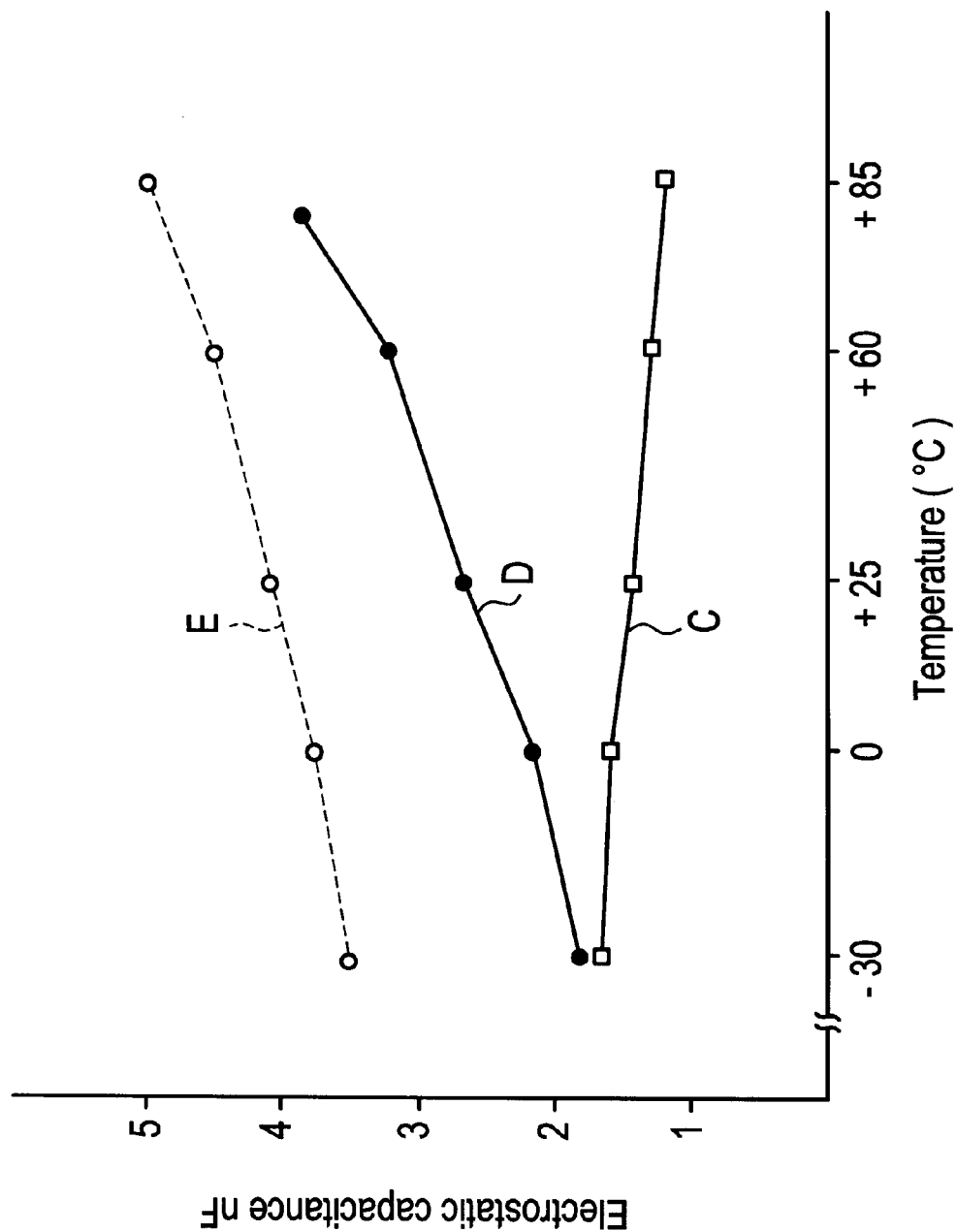
FIG. 10 is a graph for explanation of the temperature characteristics of the sensor according to the first preferred embodiment sensor.

Next, the thermal or temperature characteristics of the ultrasonic sensor 1 made according to the above specifications were measured while varying patterns of the temperature of an environment where the ultrasonic sensor 1 is to be disposed. The results were as shown in FIG. 10. In FIG. 10, the transverse axis indicates temperature whereas the longitudinal axis is actually measured electrostatic capacitance values of the ultrasonic sensor. Also, a solid line C designates the temperature characteristic of the temperature compensation capacitor 5 per se as used herein, a solid line D shows the temperature characteristic of an ultrasonic sensor with the temperature compensation capacitor 5 excluded, and a dashed line E is the temperature characteristic of the ultrasonic sensor 1—i.e. an ultrasonic sensor including therein the temperature compensation capacitor 5.

As apparent from FIG. 10, it may be seen that a combination of the temperature compensation capacitor 5 with the sensor enables suppression of a change in total capacitance of the ultrasonic sensor 1 due to temperature variations as demonstrated by the solid line E.

Figure 11:
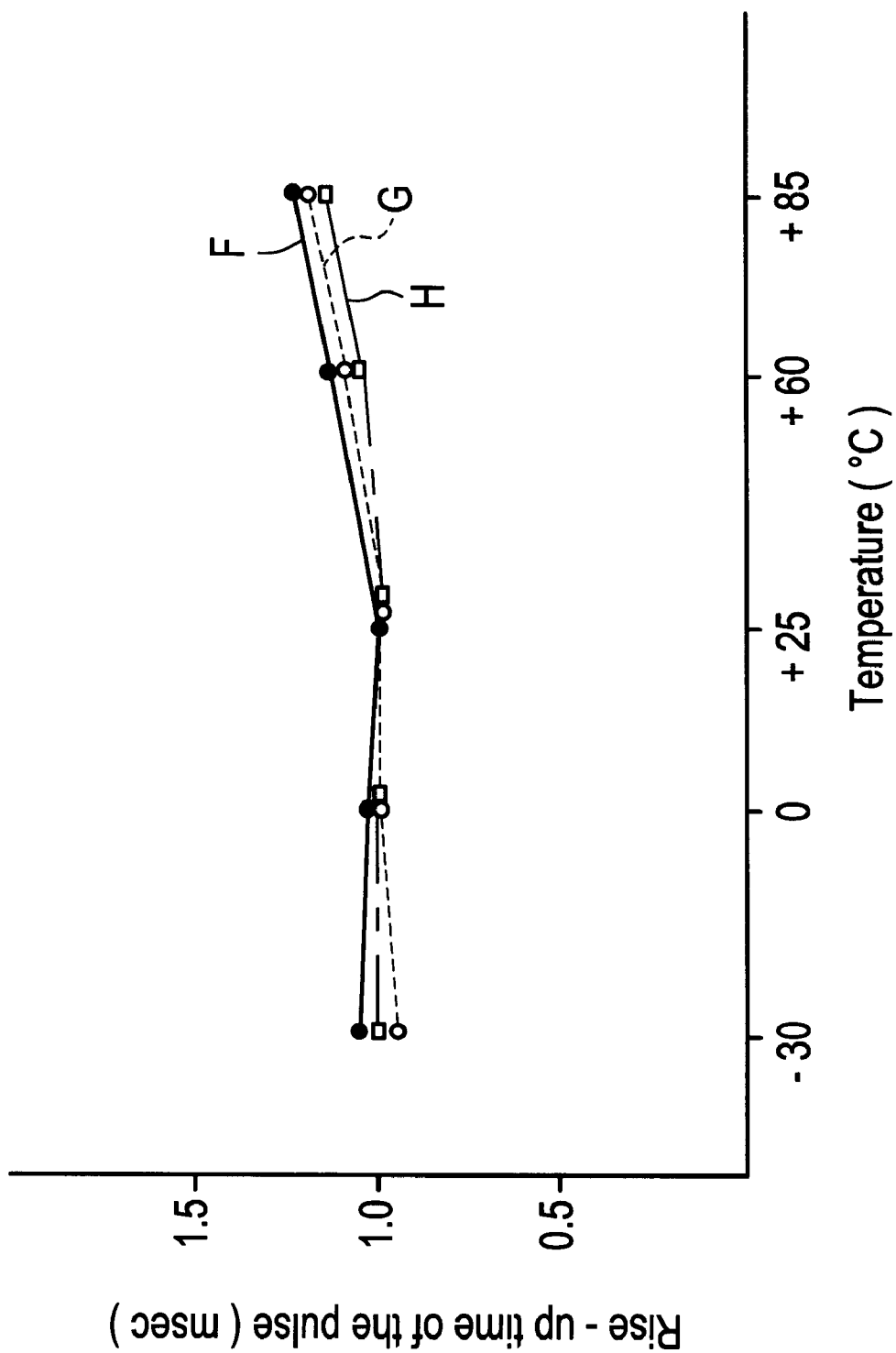
FIG. 11 is a diagram for explanation of the temperature characteristics of ultrasonic sensors in accordance with the first and second preferred embodiments and one prior art sensor.
Figure 12:
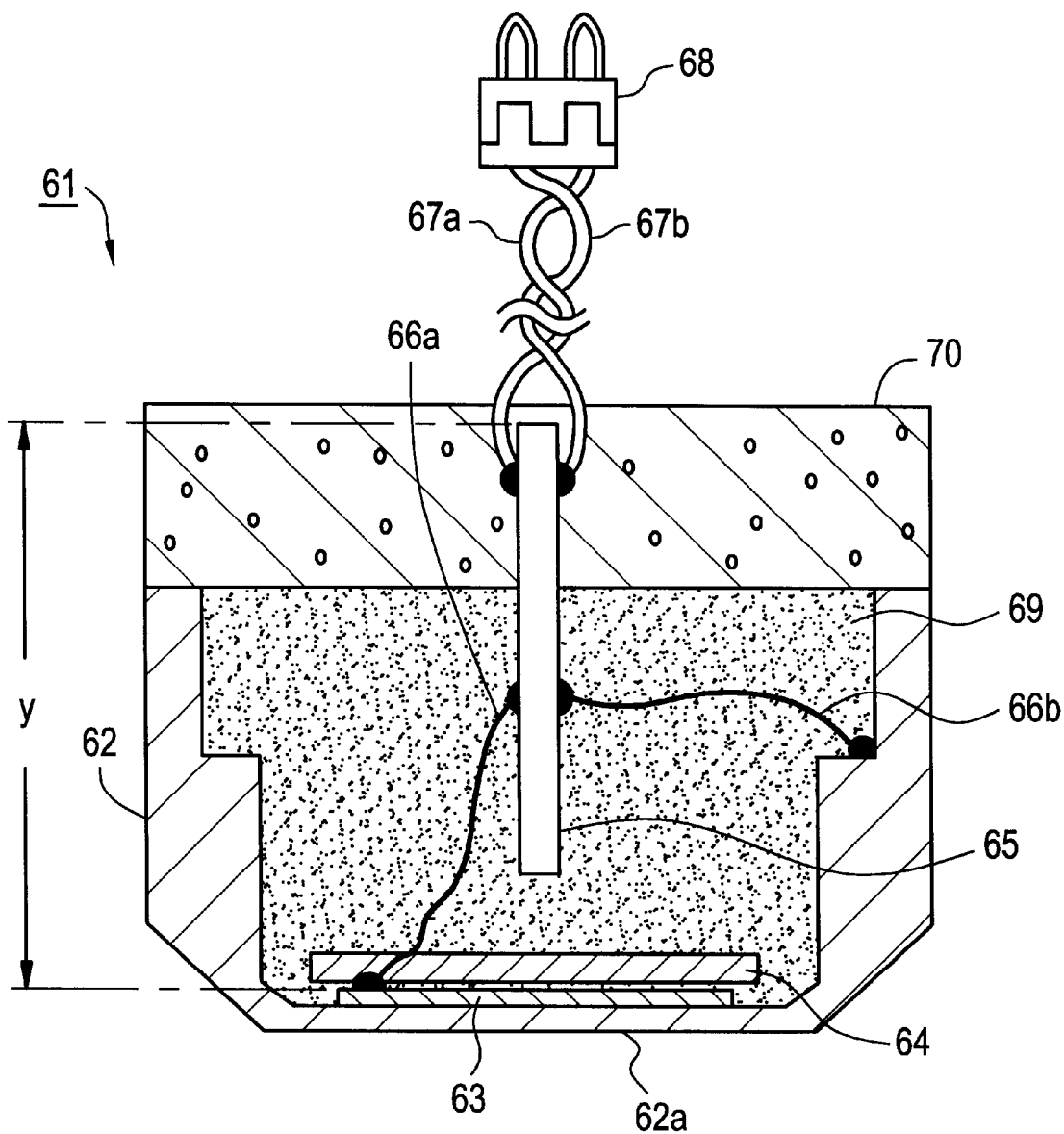
FIG. 12 shows in cross-section a prior art ultrasonic sensor.

Next, the temperature characteristic was measured as to pulse fall-down time of a respective one of the ultrasonic sensors 1, 31 and the prior art ultrasonic sensor 61 shown in FIG. 12. The results are shown in FIG. 11. One sensor sample with the prescribed specifications was used as the ultrasonic sensor 1; the ultrasonic sensors 31, 61 were prepared to have specifications which follow.

The specifications of the ultrasonic sensor 31 were the same as those of the ultrasonic sensor 1 except that the sensor 31 had a resistive element 23 of 10 k Ω in resistance value and a transformer element 22 of $L_1$=64 $\mu$H and $L_2$=3.86 mH.

The prior art ultrasonic sensor 61 had the same specifications as those of the ultrasonic sensor 1 of the first preferred embodiment except for a capacitor consisting of a dielectric ceramic plate having a diameter of 8.3 mm and a thickness of 0.51 mm with silver electrodes disposed on its two principal surfaces, and that the distance between the piezoelectric vibration element 63 in FIG. 12 and the farthest part of temperature compensation capacitor 65 from the piezoelectric vibration element 63 was set at y=5 mm.

In FIG. 11 a solid line F designates an experimental result of the prior art ultrasonic sensor, dashed line G shows that of the ultrasonic sensor 1 in accordance with the first preferred embodiment, and solid line H is that of the ultrasonic sensor 21 in accordance with the second preferred embodiment.

The results of FIG. 11 are also presented in Table 1 below.

TABLE 1

| Criteria | Pulse Rise-Up Time (m sec) | | | | |
| --- | --- | --- | --- | --- | --- |
| | −30° C. | 0° C. | +25° C. | +60° C. | +85° C. |
| Prior Art | 1.06 | 1.02 | 1.00 | 1.14 | 1.25 |
| Ultrasonic Sensor 1 | 1.00 | 1.00 | 1.00 | 1.10 | 1.20 |
| Ultrasonic Sensor 31 | 0.95 | 1.00 | 1.00 | 1.06 | 1.16 |

It will be understood from FIG. 11 and Table 1 that in the ultrasonic sensors 1, 31, a variation of the pulse fall time remains less even when a temperature change is applied thereto as compared to the prior art ultrasonic sensor 61. Accordingly, it may be readily seen that the ultrasonic sensors 1, 31 significantly improve the temperature characteristics when compared to the prior art ultrasonic sensor 61.

Although the invention has been disclosed and illustrated with reference to particular preferred embodiments, the principles involved are susceptible for use in numerous other embodiments, modification and alterations which will be apparent to persons skilled in the art to which the invention pertains. The invention is, therefore, to be limited only as indicated by the scope of the appended claims.

What is claimed is:

1. An ultrasonic sensor, comprising:

a casing;

a piezoelectric vibration element housed in said casing;

a temperature compensation capacitor housed in said casing;

a pair of electrodes provided on one common surface of said temperature compensation capacitor;

a pair of first lead wires electrically connecting said piezoelectric element and said temperature compensation capacitor via said pair of electrodes, respectively; and a pair of second lead wires connected to said temperature compensation capacitor via said pair of electrodes respectively and extending from an interior of the casing to an exterior of the casing.

2. The sensor according to claim 1, wherein the temperature compensation capacitor has a width that is less than about $\lambda/4$ measured in a propagation direction of ultrasonic wave, where $\lambda$ is a wavelength of an ultrasonic wave generated by said piezoelectric vibration element.

3. The sensor according to claim 2, wherein a distance between a portion of the temperature compensation capacitor which is spaced farthest from the piezoelectric vibration element and said piezoelectric vibration element is less than about $\lambda/4$ measured in the propagation direction of the ultrasonic wave.

4. The sensor according to claim 1, wherein a distance between a portion of the temperature compensation capacitor spaced farthest from the piezoelectric vibration element and said piezoelectric vibration element is less than about $\lambda/4$ measured in a propagation direction of an ultrasonic wave, where $\lambda$ is a wavelength of an ultrasonic wave generated by said piezoelectric vibration element.

5. The sensor according to claim 1, wherein said temperature compensation capacitor has a substantially rectangular shape.

6. The sensor according to claim 1, wherein said temperature compensation capacitor has a substantially circular shape.

7. An ultrasonic sensor, comprising:

a casing;

a piezoelectric vibration element housed in said casing;

a temperature compensation capacitor housed in said casing;

a pair of electrodes provided disposed on said temperature compensation capacitor;

a pair of first lead wires electrically connecting said piezoelectric element and said temperature compensation capacitor via said pair of electrodes, respectively, said first pair of lead wires being connected to a single common surface of said temperature compensation capacitor; and a pair of second lead wires connected to said temperature compensation capacitor via said pair of electrodes respectively and extending from an interior of the casing to an exterior of the casing.

8. The sensor according to claim 7, wherein the second pair of lead wires is connected to a single common surface of said temperature compensation capacitor.

9. The sensor according to claim 7, wherein the pair of electrodes provided on said temperature compensation capacitor are located on a single common surface of said temperature compensation capacitor.

10. The sensor according to claim 7, wherein the temperature compensation capacitor has a width that is less than about $\lambda/4$ measured in a propagation direction of ultrasonic wave, where $\lambda$ is a wavelength of an ultrasonic wave generated by said piezoelectric vibration element.

11. The sensor according to claim 10, wherein a distance between a portion of the temperature compensation capacitor which is spaced farthest from the piezoelectric vibration element and said piezoelectric vibration element is less than about $\lambda/4$ measured in the propagation direction of the ultrasonic wave.

12. The sensor according to claim 7, wherein a distance between a portion of the temperature compensation capacitor spaced farthest from the piezoelectric vibration element and said piezoelectric vibration element is less than about $\lambda/4$ measured in a propagation direction of an ultrasonic wave, where $\lambda$ is a wavelength of an ultrasonic wave generated by said piezoelectric vibration element.

13. The sensor according to claim 7, wherein said temperature compensation capacitor has a substantially rectangular shape.

14. The sensor according to claim 7, wherein said temperature compensation capacitor has a substantially circular shape.

* * * * *